(12) United States Patent
Zhang et al.

(10) Patent No.: US 11,119,761 B2
(45) Date of Patent: Sep. 14, 2021

(54) IDENTIFYING IMPLICIT DEPENDENCIES BETWEEN CODE ARTIFACTS

(71) Applicant: International Business Machines Corporation, Armonk, NY (US)

(72) Inventors: Bo Zhang, Cary, NC (US); Xianjun Zhu, Cary, NC (US); Bradley C. Herrin, Austin, TX (US); Liwei Wang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/537,723

(22) Filed: Aug. 12, 2019

(65) Prior Publication Data

US 2021/0049008 A1 Feb. 18, 2021

(51) Int. Cl.
*G06F 9/44* (2018.01)
*G06F 8/73* (2018.01)
*G06N 5/02* (2006.01)
*G06F 16/2458* (2019.01)

(52) U.S. Cl.
CPC ............ *G06F 8/73* (2013.01); *G06F 16/2465* (2019.01); *G06N 5/025* (2013.01); *G06F 2216/03* (2013.01)

(58) Field of Classification Search
None
See application file for complete search history.

(56) References Cited

U.S. PATENT DOCUMENTS 9,898,393 B2 2/2018 Moorthi et al.
10,642,719 B1* 5/2020 Balasubramanian ........................ G06F 11/3055
2005/0114842 A1* 5/2005 Fleehart .............. G06F 11/3608 717/126
2006/0242175 A1* 10/2006 Tsyganskiy ............... G06F 8/72
2007/0174023 A1* 7/2007 Bassin ................ G06F 11/3688 702/186

(Continued)

OTHER PUBLICATIONS

Konopka et al., "Software Developer Activity as a Source for Identifying Hidden Source Code Dependencies," 41st International Conference on Current Trends in Theory and Practice of Computer Science, Pec pod Snezkou, Czech Republic, Jan. 24-29, 2015, pp. 449-462.

(Continued)

*Primary Examiner* — Insun Kang
(74) *Attorney, Agent, or Firm* — Robert A. Voigt, Jr.; Winstead PC

(57) ABSTRACT

A computer-implemented method, system and computer program product for identifying implicit dependencies between code artifacts. Co-defect association rules between code artifacts are generated, where such co-defect association rules include a prediction of how likely there will be a defect in a code artifact when there is a defect in an associated code artifact. After detecting a defect in a first code artifact, the co-defect association rules are reviewed to identify any code artifacts associated with the first code artifact. If there is a code artifact associated with the first code artifact, and if the probability of the associated code artifact being defected when the first code artifact is defected exceeds a threshold value, then a recommendation is made to the user to review not only the first code artifact that was defected but also its associated code artifact for a potential defect.

17 Claims, 6 Drawing Sheets

(56) References Cited

U.S. PATENT DOCUMENTS

| | | | | |
|---|---|---|---|---|
| 2009/0133006 A1* | 5/2009 | Cheung | ............. | G06F 8/71 |
| | | | | 717/144 |
| 2009/0328009 A1* | 12/2009 | Scholz | ............. | G06F 8/70 |
| | | | | 717/132 |
| 2013/0219362 A1* | 8/2013 | Cai | ............. | G06F 8/74 |
| | | | | 717/123 |
| 2013/0283115 A1* | 10/2013 | Sazeides | ......... | H03M 13/033 |
| | | | | 714/752 |
| 2013/0311968 A1 | 11/2013 | Sharma | | |
| 2014/0033176 A1* | 1/2014 | Rama | ............ | G06F 11/008 |
| | | | | 717/124 |
| 2014/0289712 A1* | 9/2014 | Gupta | .......... | G06F 11/3608 |
| | | | | 717/132 |
| 2015/0355993 A1* | 12/2015 | Hwang | ........... | G06F 8/315 |
| | | | | 714/38.1 |
| 2016/0378453 A1* | 12/2016 | Kalidindi | ....... | G06F 8/65 |
| | | | | 717/173 |
| 2017/0090877 A1* | 3/2017 | Hale | ............. | G06F 8/65 |
| 2017/0090889 A1* | 3/2017 | Hale | ............. | G06F 8/433 |
| 2018/0121659 A1 | 5/2018 | Sawhney et al. | | |
| 2018/0276562 A1* | 9/2018 | Woulfe | ......... | G06N 3/0445 |
| 2020/0073781 A1* | 3/2020 | Falko | ............ | G06F 11/3608 |
| 2020/0073784 A1* | 3/2020 | Cheng | ........... | G06F 11/3616 |

OTHER PUBLICATIONS

Aversano et al., "Learning from Bug-Introducing Changes to Prevent Fault Prone Code," WPSE'07, Sep. 3-4, 2007, Dubrovnik, Croatia, pp. 19-26.

Sharafat et al., "A Probabilistic Approach to Predict Changes in Object-Oriented Software Systems," 11th European Conference on Software Maintenance and Reengineering (CSMR'07), Mar. 21-23, 2007, pp. 1-10.

Thomas Zimmermann, "Mining Version Histories to Guide Software Changes," Diploma Thesis, Universitat Passau, 2004, pp. 1-82.

Sculley et al., "Machine Learning: The High-Interest Credit Card of Technical Debt," 2014, pp. 1-9.

Hassan et al., "Software Intelligence: The Future of Mining Software Engineering Data," FoSER 2010, Nov. 7-8, 2010, Santa Fe, New Mexico, USA, pp. 1-5.

Zhou et al., "A Bayesian Network Based Approach for Change Coupling Prediction," 15th Working Conference on Reverse Engineering, Oct. 15-18, 2008 pp. 1-10.

* cited by examiner

| Rule | Support | Confidence | Lift |
|---|---|---|---|
| {mojo/dataframe.py} => {mojo/analytics.py} | 0.001 | 0.787 | 19 |
| pandas => numpy | 0.002 | 0.659 | 18.2 |
| {mojo/batch.py#L27} => {mojo/stream.py#L19} | 0.005 | 0.398 | 12.4 |

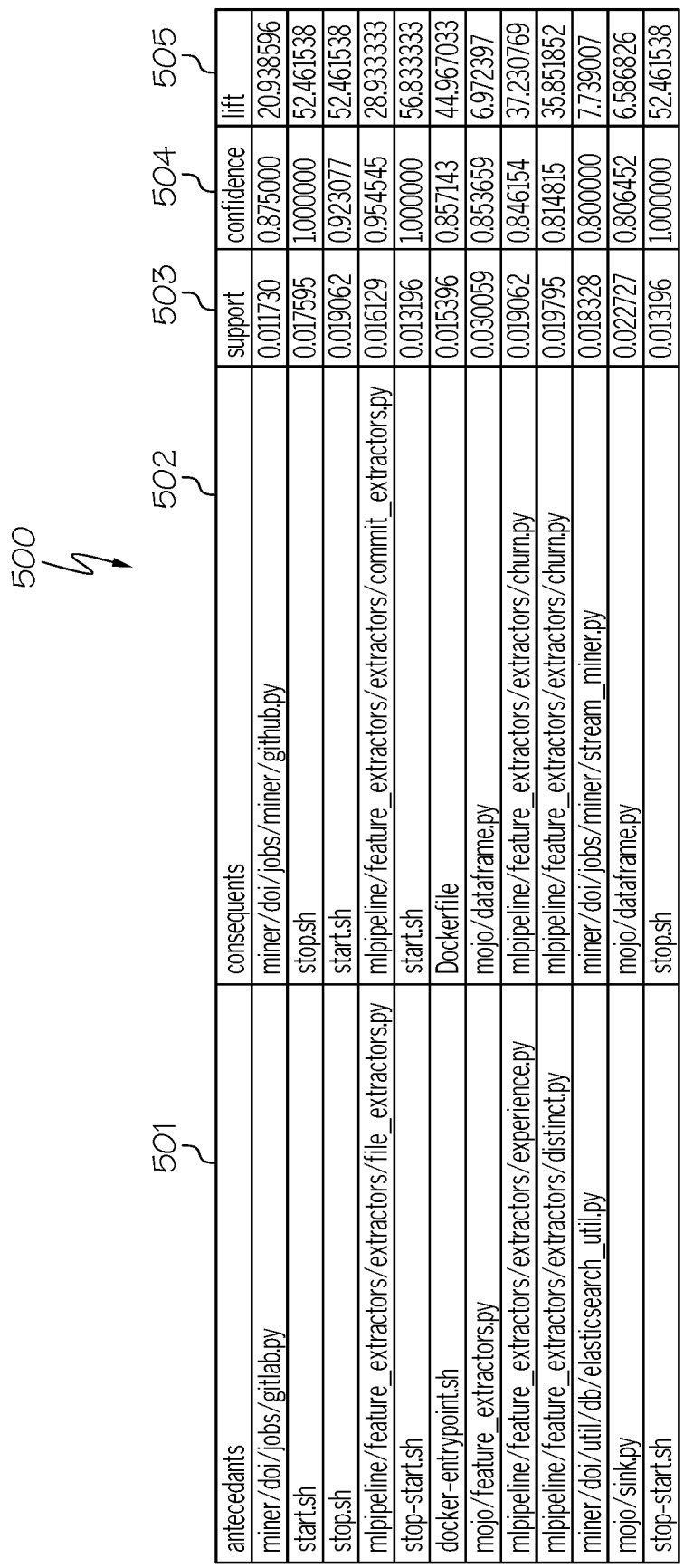

| antecedants | consequents | support | confidence | lift |
|---|---|---|---|---|
| miner/doi/jobs/gitlab.py | miner/doi/jobs/miner/github.py | 0.011730 | 0.875000 | 20.938596 |
| start.sh | stop.sh | 0.017595 | 1.000000 | 52.461538 |
| stop.sh | start.sh | 0.019062 | 0.923077 | 52.461538 |
| mlpipeline/feature_extractors/extractors/file_extractors.py | mlpipeline/feature_extractors/extractors/commit_extractors.py | 0.016129 | 0.954545 | 28.933333 |
| stop-start.sh | start.sh | 0.013196 | 1.000000 | 56.833333 |
| docker-entrypoint.sh | Dockerfile | 0.015396 | 0.857143 | 44.967033 |
| mojo/feature_extractors.py | mojo/dataframe.py | 0.030059 | 0.853659 | 6.972397 |
| mlpipeline/feature_extractors/extractors/experience.py | mlpipeline/feature_extractors/extractors/churn.py | 0.019062 | 0.846154 | 37.230769 |
| mlpipeline/feature_extractors/extractors/distinct.py | mlpipeline/feature_extractors/extractors/churn.py | 0.019795 | 0.814815 | 35.851852 |
| miner/doi/util/db/elasticsearch_util.py | miner/doi/jobs/miner/stream_miner.py | 0.018328 | 0.800000 | 7.739007 |
| mojo/sink.py | mojo/dataframe.py | 0.022727 | 0.806452 | 6.586826 |
| stop-start.sh | stop.sh | 0.013196 | 1.000000 | 52.461538 |

FIG. 5

IDENTIFYING IMPLICIT DEPENDENCIES BETWEEN CODE ARTIFACTS

TECHNICAL FIELD

The present invention relates generally to software development, and more particularly to identifying implicit dependencies between code artifacts to identify code artifacts which get changed together as well as to identify code artifacts which get defected together.

BACKGROUND

Software development is the process of conceiving, specifying, designing, programming, documenting, testing, and bug fixing involved in creating and maintaining applications, frameworks, or other software components.

Maintaining software can be more and more expensive over time since the quality of the code can decline over time and it becomes more and more challenging to address any defects (e.g., functional errors, compilation errors, missing commands, run time errors, communication problems, logical errors, inappropriate error handling, calculation issues). Such defects may be caused by poorly managed dependencies between source code artifacts (tangible by-products produced during the development of software, such as lines of code, packages, modules, folders, etc.), especially implicit dependencies. As a result, dependencies between source code artifacts (or simply "code artifacts") are important to know throughout the software life.

A software artifact is said to be dependent upon another software artifact when the software artifact is reliant upon that other software artifact to function properly. Some dependencies may only exist in the code, such as within a class, as opposed to existing in its public interface. As a result, a user will not be aware of such dependencies (referred to as "implicit dependencies"), such as while instantiating the class. Consequently, implicit dependencies are difficult to identify.

SUMMARY

In one embodiment of the present invention, a computer-implemented method for identifying implicit dependencies between code artifacts comprises generating co-defect association rules between code artifacts, where the co-defect association rules comprise a prediction of how likely there will be a defect in a second code artifact when a first code artifact is defected. The method further comprises detecting a defect in the first code artifact. The method additionally comprises reviewing the co-defect association rules to identify any code artifacts associated with the first code artifact. Furthermore, the method comprises recommending reviewing a second code artifact associated with the first code artifact for a potential defect in addition to reviewing the first code artifact in response to identifying the second code artifact being associated with the first code artifact from the co-defect association rules and in response to a probability of the second code artifact being defected when the first code artifact is defected exceeding a first threshold value.

Other forms of the embodiment of the computer-implemented method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 5 is a table illustrating the co-defect association rules in accordance with an embodiment of the present invention;

DETAILED DESCRIPTION

The present invention comprises a computer-implemented method, system and computer program product for identifying implicit dependencies between code artifacts. In one embodiment of the present invention, co-defect association rules between code artifacts are generated, where such co-defect association rules include a prediction of how likely there will be a defect in a code artifact when there is a defect in an associated code artifact. After detecting a defect in a first code artifact, the co-defect association rules are reviewed to identify any code artifacts that are associated with the first code artifact. If there is a code artifact associated with the first code artifact, then the probability of the associated code artifact being defected when the first code artifact is defected is obtained from the co-defect association rules. If the probability of the associated code artifact being defected when the first code artifact is defected exceeds a threshold value, then a recommendation is made to the user to review not only the first code artifact that was defected but also its associated code artifact for a potential defect. In this manner, the present invention provides the means for detecting code artifacts which get defected together thereby providing extremely valuable information to the software developer in developing and maintaining the software.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
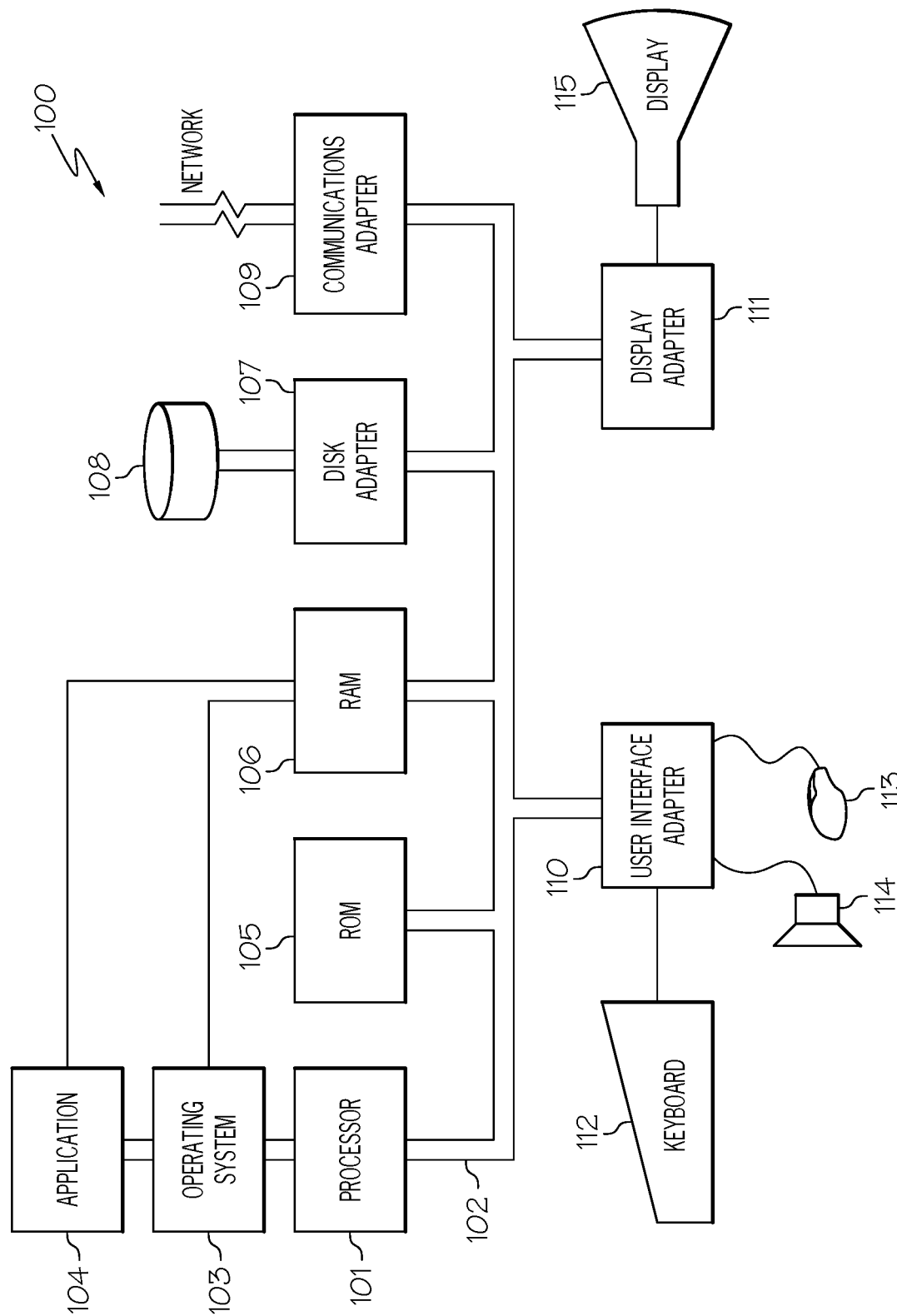
FIG. 1 illustrates an embodiment of the present invention of a hardware configuration of a computing device which is representative of a hardware environment for practicing the present invention.

Referring now to the Figures in detail, FIG. 1 illustrates an embodiment of the present invention of the hardware configuration of a computing device 100 which is representative of a hardware environment for practicing the present invention. Computing device 100 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of identifying implicit dependencies between code artifacts to identify code artifacts which get changed together as well as identify code artifacts which get defected together. Referring to FIG. 1, computing device 100 has a processor 101 connected to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for identifying implicit dependencies between code artifacts, such as to identify code artifacts which get changed together as well as to identify code artifacts which get defected together, as discussed further below in connection with FIGS. 2-7.

Referring again to FIG. 1, read-only memory ("ROM") 105 is connected to system bus 102 and includes a basic input/output system ("BIOS") that controls certain basic functions of computing device 100. Random access memory ("RAM") 106 and disk adapter 107 are also connected to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for identifying implicit dependencies between code artifacts, such as to identify code artifacts which get changed together as well as to identify code artifacts which get defected together, as discussed further below in connection with FIGS. 2-7, may reside in disk unit 108 or in application 104.

Computing device 100 may further include a communications adapter 109 connected to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, software development is the process of conceiving, specifying, designing, programming, documenting, testing, and bug fixing involved in creating and maintaining applications, frameworks, or other software components. Maintaining software can be more and more expensive over time since the quality of the code can decline over time and it becomes more and more challenging to address any defects (e.g., functional errors, compilation errors, missing commands, run time errors, communication problems, logical errors, inappropriate error handling, calculation issues). Such defects may be caused by poorly managed dependencies between source code artifacts (tangible by-products produced during the development of software, such as lines of code, packages, modules, folders, etc.), especially implicit dependencies. As a result, dependencies between source code artifacts (or simply "code artifacts") are important to know throughout the software life. A software artifact is said to be dependent upon another software artifact when the software artifact is reliant upon that other software artifact to function properly. Some dependencies may only exist in the code, such as within a class, as opposed to existing in its public interface. As a result, a user will not be aware of such dependencies (referred to as "implicit dependencies"), such as while instantiating the class. Consequently, implicit dependencies are difficult to identify. Currently, software developers use syntactic analysis in an attempt to identify source code dependencies, such as implicit dependencies. Such analysis may detect code artifacts which change together. However, there is not currently any means for detecting code artifacts which get defected together. For example, if a code artifact is known to be defected (e.g., functional error), other code artifacts could potentially be defected as well. Such information is extremely valuable to the software developer in developing and maintaining software.

Figures 2, 3:
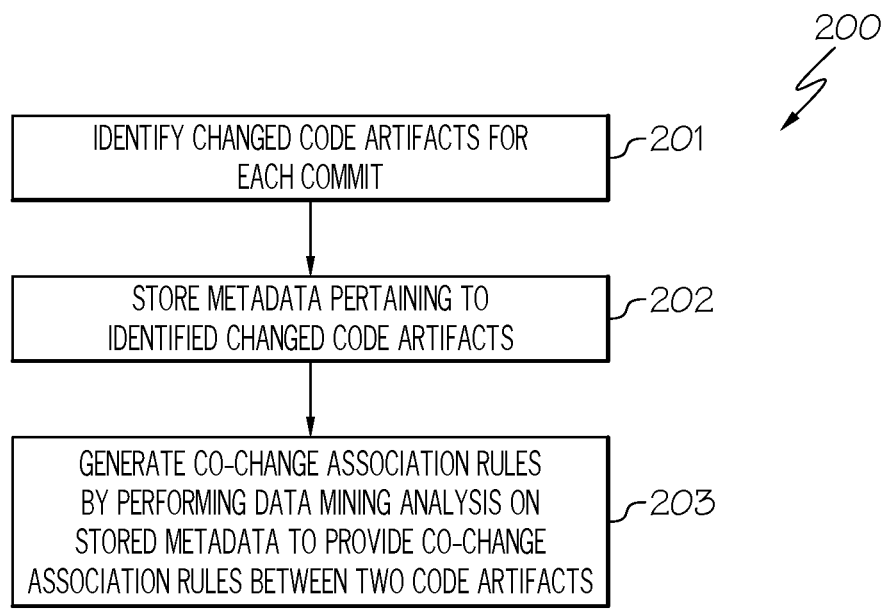
FIG. 2 is a flowchart of a method for generating co-change association rules between code artifacts in accordance with an embodiment of the present invention.
FIG. 3 is a table illustrating the co-change association rules in accordance with an embodiment of the present invention.
Figure 4:
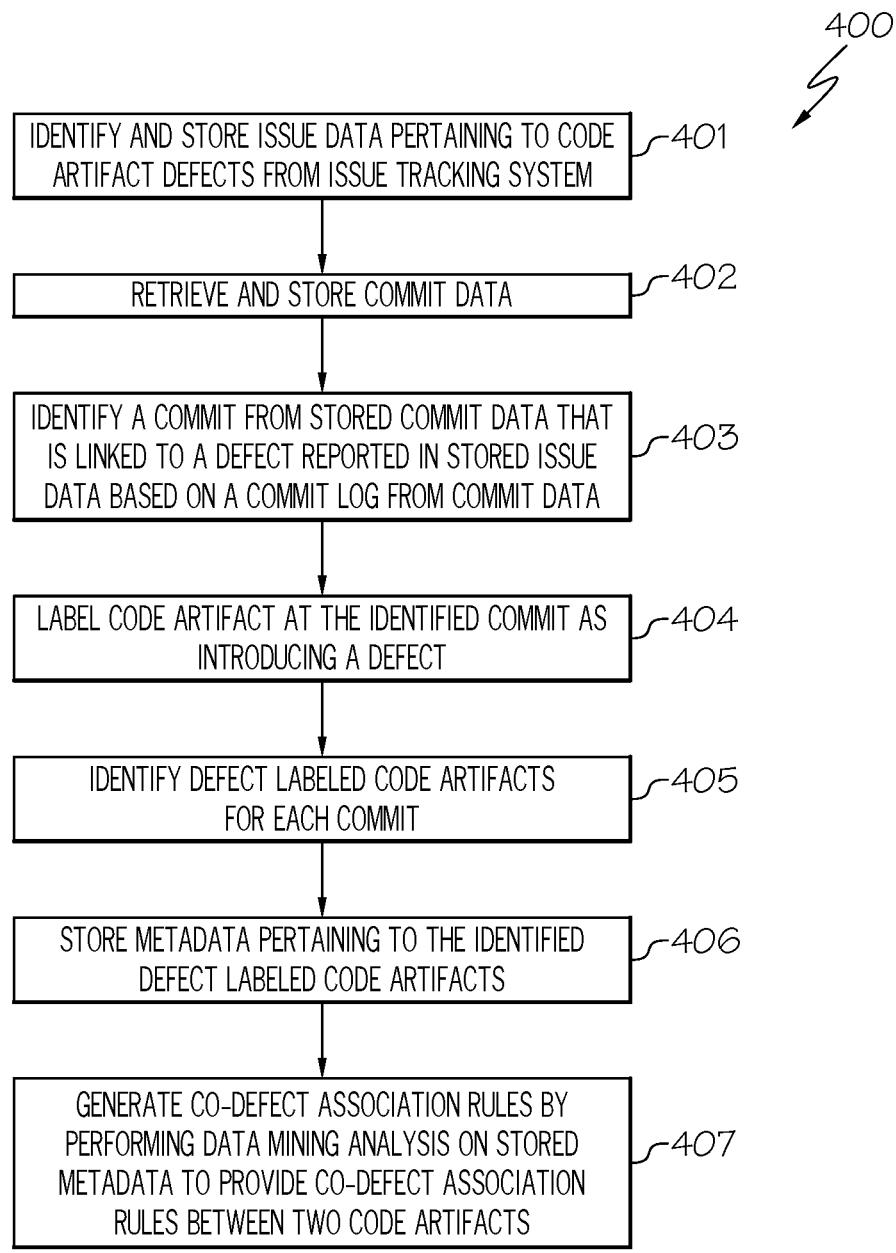
FIG. 4 is a flowchart of a method for generating co-defect association rules between code artifacts in accordance with an embodiment of the present invention.
Figure 6:
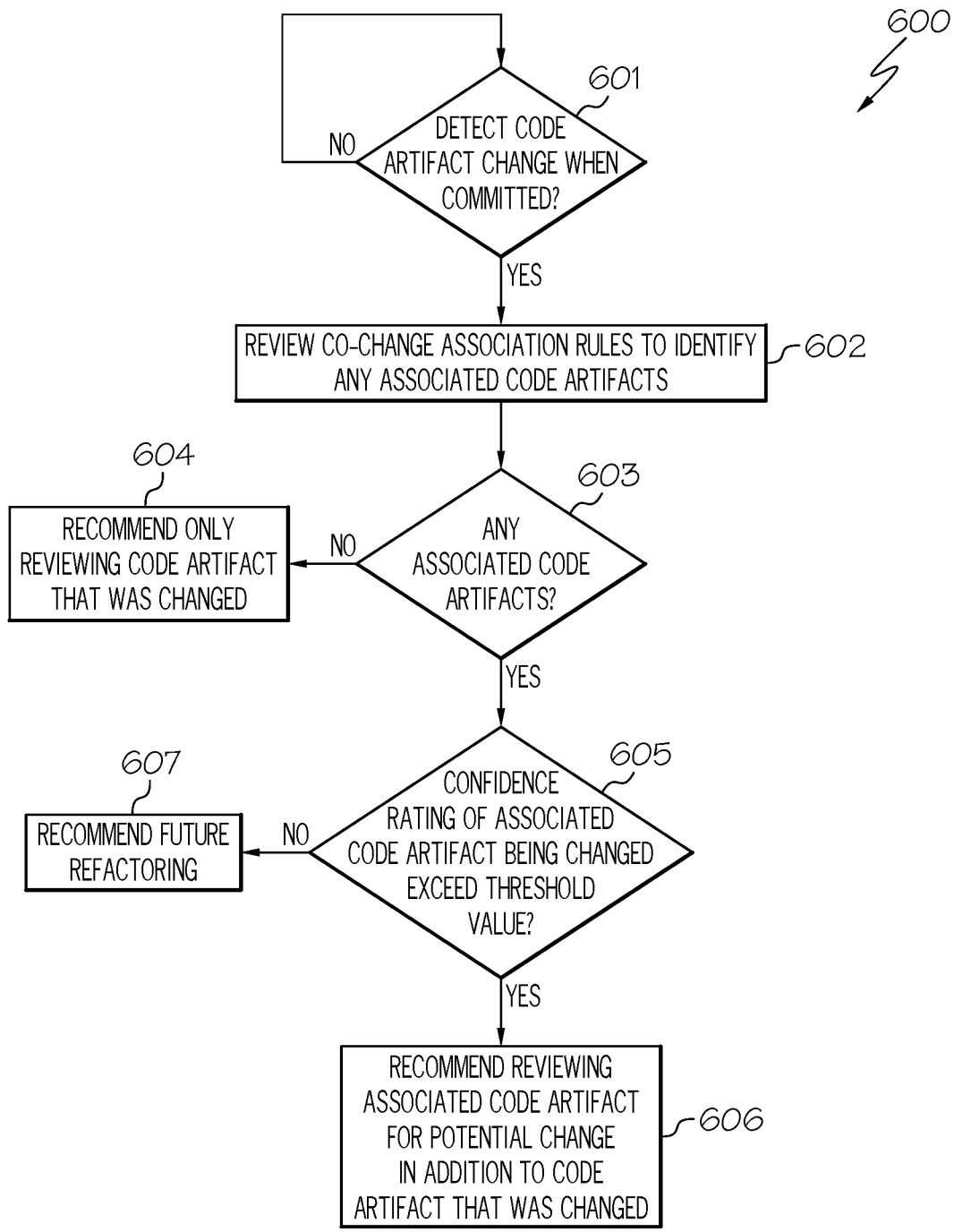
FIG. 6 is a flowchart of a method for identifying code artifacts which get changed together in accordance with an embodiment of the present invention.
Figure 7:
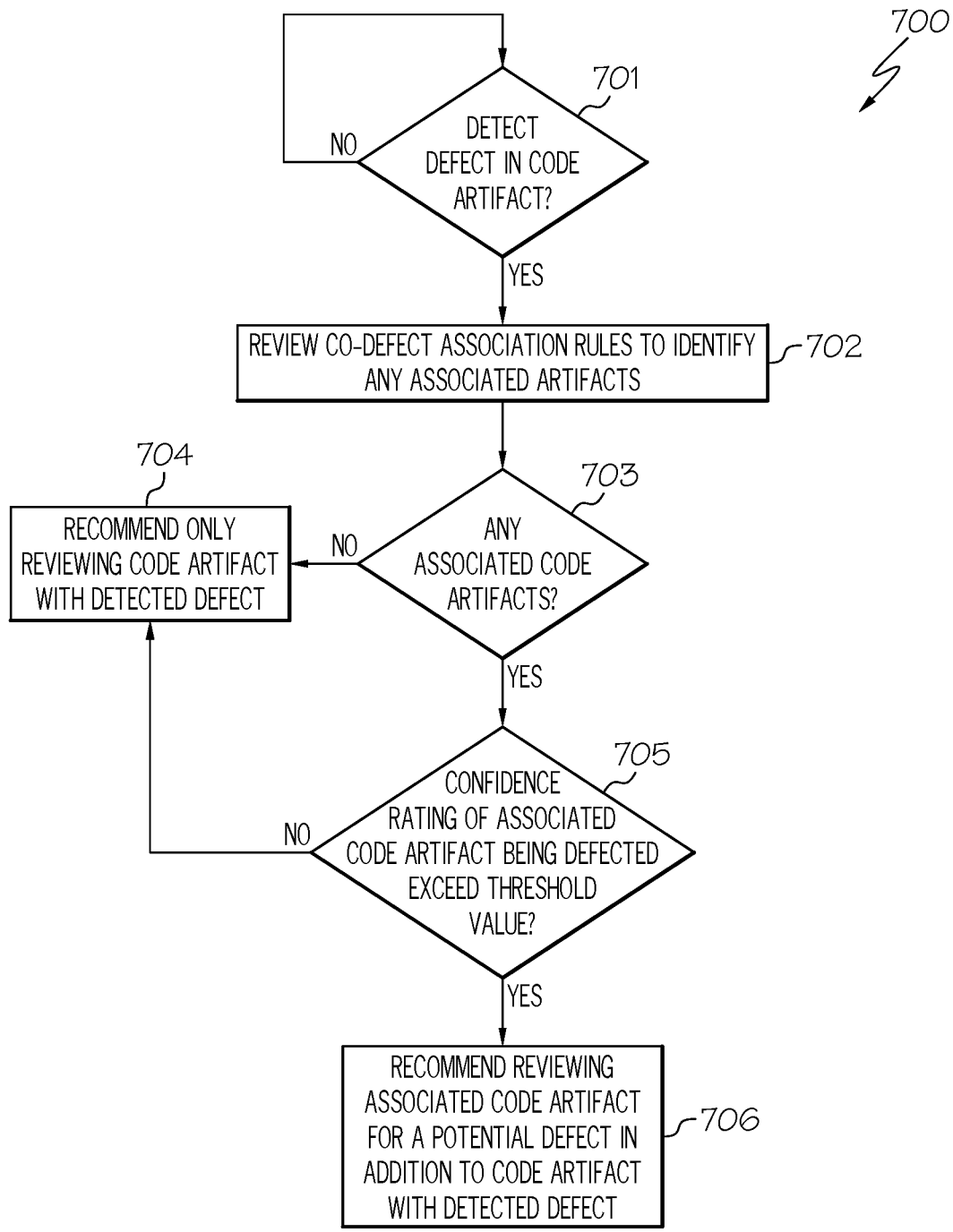
FIG. 7 is a flowchart of a method for identifying code artifacts which get defected together in accordance with an embodiment of the present invention.

The embodiments of the present invention provide a means for identifying implicit dependencies between code artifacts that not only includes identifying code artifacts which get changed together but also identifying those code artifacts which get defected together as discussed below in connection with FIGS. 2-7. FIG. 2 is a flowchart of a method for generating co-change association rules between code artifacts. FIG. 3 is a table illustrating the co-change association rules. FIG. 4 is a flowchart of a method for generating co-defect association rules between code artifacts. FIG. 5 is a table illustrating the co-defect association rules. FIG. 6 is a flowchart of a method for identifying code artifacts which get changed together. FIG. 7 is a flowchart of a method for identifying code artifacts which get defected together.

As stated above, FIG. 2 is a flowchart of a method 200 for generating co-change association rules between code artifacts in accordance with an embodiment of the present invention.

Referring to FIG. 2, in conjunction with FIG. 1, in step 201, computing device 100 identifies the changed code artifacts for each commit. A "code artifact," as used herein, refers to tangible by-products produced during the development of software, such as lines of code, packages, modules, folders, etc. A "changed code artifact," as used herein, refers to a code artifact that has been changed from a previously commit. A "commit," as used herein, refers to making a set of tentative changes permanent. The record of such commits is stored in a log, referred to as a "commit log."

In one embodiment, changed code artifacts are identified for each commit based on examining the commit log, which includes the changes each commit introduces, such as changes in the code artifacts.

In step 202, computing device 100 stores the metadata pertaining to the identified changed code artifacts. In one embodiment, "metadata," as used herein, refers to the data describing the changes to the code artifact, such as when it was moved, copied, deleted, modified, etc. In one embodiment, a tool, such as artifactory query language (AQL), may be utilized to uncover any data related to the code artifacts. When a code artifact is moved, copied, deleted, modified, etc., the corresponding metadata descriptors (e.g., Ruby-Gems, Npm, etc.) may be updated to reflect the change via AQL. In one embodiment, such metadata is stored, such as in a database (not shown in the Figures) connected to computing device 100 or in a storage unit (e.g., memory 105, disk unit 108) of computing device 100.

In step 203, computing device 100 generates "co-change association rules" by performing data mining analysis on the stored metadata to provide co-change association rules between two code artifacts. "Data mining analysis," as used herein, refers to the process of discovering patterns in the metadata, such as identifying changes in code artifacts that occur concurrently. Examples of data mining analysis algorithms to perform data mining analysis on the stored metadata to provide co-change association rules between two artifacts include C4.5, k-means, support vector machines, apriori, EM, PageRank, AdaBoost, k-nearest neighbors (kNN), naïve Bayes and CART. Such data mining analysis results in forming association rules revealing underlying "correlations" between the attributes, such as the timing of the changes in the code artifacts, in the underlying metadata. In one embodiment, the data mining analysis is used to extract information based on coincidences in the metadata, which are used to form association rules.

Such association rules include "co-change association rules," which refer to predictions as to how likely there will be a change in a code artifact when there is a change in another code artifact as shown in FIG. 3.

Referring to FIG. 3, FIG. 3 is a table 300 illustrating the co-change association rules in accordance with an embodiment of the present invention. As shown in FIG. 3, table 300 includes a column 301 listing the association rules between two code artifacts. For example, column 301 includes the association rule between the following set of code artifacts: "{mojo/dataframe.py}=>{mojo/analytics.py}", "pandas=>numpy", and "{mojo/batch.py#L27}=>{mojo/stream.py#L19}." Columns 302, 303, 304 of table 300 provide the metrics of the corresponding association rule (association rule in the same row as the metrics). For example, columns 302, 303, 304 include the support, confidence and lift metrics, respectively, of the corresponding association rule. "Support" is the relative frequency that the rule appears in the data. "Confidence" is a measure of the reliability of the rule. That is, confidence is a probability that a code artifact will be changed if an associated code artifact is changed. For example, as shown in FIG. 3, for the association rule between {mojo/dataframe.py}=>{mojo/analytics.py}, there is a confidence of 0.787 meaning that there is a 78.7% chance that when the code artifact of {mojo/dataframe.py} is changed that the code artifact of {mojo/analytics.py} will also be changed. Lastly, "lift" is used to compare confidence with the expected confidence. The higher the value of lift, the greater the degree to which those two code artifacts are dependent on one another.

In addition to generating co-change association rules, computing device 100 generates co-defect association rules as discussed below in connection with FIG. 4. Such co-defect association rules between code artifacts include a prediction as to how likely there will be a defect in a first code artifact when there is a defect in a second code artifact.

FIG. 4 is a flowchart of a method 400 for generating co-defect association rules between code artifacts in accordance with an embodiment of the present invention.

Referring to FIG. 4, in conjunction with FIG. 1, in step 401, computing device 100 identifies and stores issue data pertaining to code artifact defects (e.g., defects, such as, functional errors, compilation errors, missing commands, run time errors, communication problems, logical errors, inappropriate error handling, and calculation issues) from an issue tracking system. Many software projects use an issue tracking system to support software engineering work. In the issue tracking system development, bug fixing, defects or refactoring tasks get tracked and assigned. The information is stored in different data fields, such as title, descriptions and comments. Such data fields may contain unrestricted natural language text accompanied with metadata, such as user names or timestamps to complement the natural language data. In one embodiment, the issue tracking system natural language data mixes any kind of information from feature requests or bug reports to rationales, implementation ideas or social interaction.

In one embodiment, such issue data pertaining to code artifact defects from the issue tracking system is identified by computing device 100, such as by utilizing natural language processing algorithms. For example, keywords, such as "defect," may be discovered in the data fields indicating an issue pertaining to a code artifact defect. Information pertaining to an identified code artifact defect may include the time of the defect (obtained from the timestamp).

In one embodiment, issue data pertaining to code artifact defects acquired from an issue tracking system is stored, such as in a database (not shown in the Figures) connected to computing device 100 or in a storage unit (e.g., memory 105, disk unit 108) of computing device 100.

In step 402, computing device 100 retrieves and stores commit data. "Commit data," as used herein, includes information from commit logs, commit messages, author data, etc. In one embodiment, such commit data may be retrieved by computing device 100 from a repository (e.g., Git repository) storing commit data, which is searched and identified by computing device 100 utilizing natural language processing, such as by identifying keywords, such as "log" and "author."

In one embodiment, the commit data includes the identification of the code artifact (e.g., file name) as well as the time of the commit pertaining to the code artifact. Such retrieved commit data may be stored in a database (not shown in the Figures) connected to computing device 100 or in a storage unit (e.g., memory 105, disk unit 108) of computing device 100.

In step 403, computing device 100 identifies a commit from the stored commit data that is linked to a defect reported in the stored issue data based on the commit log from the commit data. For example, computing device 100 may identify a code artifact (e.g., file) from the commit log, where the same code artifact has been reported as having a defect in the stored issue data. In one embodiment, various information stored in the commit log may be utilized by computing device 100 to identify such a commit from the stored commit data that is linked to a defect reported in the stored issue data, such as the name of the code artifact and the time of the commit. In one embodiment, the name of the code artifact and the time of the commit may be identified from the commit log as well as identified in the defect reported in the stored issue data using natural language processing. In this manner, the commit from the stored commit data that is linked to a defect reported in the stored issue data may be identified.

In step 404, computing device 100 labels the code artifact at the identified commit as introducing a defect. For example, the code artifact (e.g., file) at the identified commit (see step 403) may be identified from the commit log. In one embodiment, such a code artifact is identified from the commit log using natural language processing. Such a code artifact is then labeled by computing device 100 as introducing a defect.

In step 405, computing device 100 identifies the defect labeled code artifacts for each commit. In one embodiment, after labeling each of the code artifacts (labeling as introducing a defect) at the commits that were identified as being linked to a defect reported in the stored issue data, computing device 100 identifies such labeled code artifacts and generates co-defect association rules between such labeled code artifacts as discussed below.

In step 406, computing device 100 stores the metadata pertaining to the identified defect labeled code artifacts. In one embodiment, a tool, such as artifactory query language (AQL), may be utilized to uncover any data related to the code artifacts. For example, when a defect for a code artifact is detected, the corresponding metadata descriptors (e.g., RubyGems, Npm, etc.) may be updated to reflect the defect via AQL. In one embodiment, such metadata is stored, such as in a database (not shown in the Figures) connected to computing device 100 or in a storage unit (e.g., memory 105, disk unit 108) of computing device 100.

In step 407, computing device 100 generates "co-defect association rules" by performing data mining analysis on the stored metadata to provide co-defect association rules between two artifacts. Examples of data mining analysis algorithms to perform data mining analysis on the stored metadata to provide co-defect association rules between two artifacts include C4.5, k-means, support vector machines, apriori, EM, PageRank, AdaBoost, k-nearest neighbors (kNN), naïve Bayes and CART. Such data mining analysis results in forming association rules revealing underlying "correlations" between the attributes, such as timing of the defects in the code artifacts, in the underlying metadata. In one embodiment, the data mining analysis is used to extract information based on coincidences in the metadata, which are used to form association rules.

Such association rules include "co-defect association rules," which refer to predictions as to how likely there will be a defect in a code artifact when there is a defect in another code artifact as shown in FIG. 5.

Referring to FIG. 5, FIG. 5 is a table 500 illustrating the co-defect association rules in accordance with an embodiment of the present invention. As shown in FIG. 5, table 500 includes a column 501 of "antecedents" and a column 502 of "consequents" forming an association rule between two code artifacts, where the "antecedent" refers to the code artifact with the detected defect and the "consequent" refers to the code artifact that is logically coupled to the antecedent code artifact. The degree of such logical coupling is based on the metrics of the association rule shown in columns 503, 504, 505.

For example, columns 503, 504, 505 include the support, confidence and lift metrics, respectively, of the association rule. "Support" is the relative frequency that the rule appears in the data. "Confidence" is a measure of the reliability of the rule. That is, confidence is a probability that a code artifact will be defected if an associated code artifact is defected. For example, as shown in FIG. 5, for the association rule between "miner/doi/jobs/miner/gitlab.py" (antecedent) and "miner/doi/jobs/miner/github.py" (consequent), there is a confidence of 0.875 meaning that there is a 87.5% chance that when the code artifact of "miner/doi/jobs/miner/gitlab.py" (antecedent) has a defect that the code artifact of "miner/doi/jobs/miner/github.py" (consequent) will also be defected. Lastly, "lift" is used to compare confidence with the expected confidence. The higher the value of lift, the greater the degree to which those two code artifacts are dependent on one another.

By utilizing the co-change association rules and the co-defect association rules, computing device 100 can identify implicit dependencies between code artifacts that not only includes identifying code artifacts which get changed together but also identifying those code artifacts which get defected together as discussed below in connection with FIGS. 6 and 7.

FIG. 6 is a flowchart of a method 600 for identifying code artifacts which get changed together in accordance with an embodiment of the present invention.

Referring to FIG. 6, in conjunction with FIGS. 1-3, in step 601, a determination is made by computing device 100 as to whether any code artifact change is detected when committed. As previously discussed, such a change may be detected by examining the commit log, which includes the changes each commit introduces, such as changes in the code artifacts.

If computing device 100 has not detected any code artifact changes when committed, then computing device 100 continues to determine whether any code artifact change is detected when committed in step 601.

If, however, computing device 100 detected a code artifact change when committed, then, in step 602, computing device 100 reviews the co-change association rules to identify any code artifacts that are associated with the detected code artifact that was changed when committed. "Associated," as used herein, refers to a code artifact being associated to the detected code artifact via the co-association rule. For example, if the file "pandas" was a code artifact that was changed when committed, then computing device 100 identifies the file "numpy" as being associated with the file "pandas" from the co-change association rules as shown in table 300 of FIG. 3.

In step 603, a determination is made by computing device 100 as to whether any associated code artifacts were discovered.

If there were no associated code artifacts discovered, then, in step 604, computing device 100 recommends only reviewing the code artifact that was changed. In one embodiment, such a recommendation is displayed to the user of computing device 100 on display 115.

If, however, associated code artifacts were discovered, then, in step 605, a determination is made by computing device 100 as to whether the confidence rating of the associated code artifact also being changed exceeds a threshold value. For instance, referring to the above example pertaining to the files of "pandas" and "numpy," computing device 100 may compare the confidence rating of 0.659 (probability of 65.9%), involving the association rule between "pandas" and "numpy" as shown in table 300 of FIG. 3, to a threshold value, which may be user-selected. In such an example, the association rule indicates that there is a 65.9% chance that when the file "pandas" has changed that the file "numpy" will be changed.

If the confidence rating exceeds a threshold value, then, in step 606, computing device 100 recommends reviewing the associated code artifact for a potential change in addition to the code artifact that was changed. For example, referring to the above example, if the confidence rating of 0.659 (probability of 65.9%) involving the association rule between "pandas" and "numpy" exceeds a threshold value (e.g., 0.500 or probability of 50%), then computing device 100 recommends to the user of computing device 100 to review the file "numpy" for a potential change in addition to reviewing the file "pandas" that was changed. In this manner, computing device 100 is informing the user of computing device 100 of an implicit dependency between two code artifacts which get changed together. In one embodiment, such a recommendation is displayed to the user of computing device 100 on display 115.

If, however, the confidence rating does not exceed a threshold value, then, in step 607, computing device 100 recommends future refactoring. "Refactoring," as used herein, is the process of restricting existing computing code—changing the factoring—without changing its external behavior. Refactoring is intended to improve the nonfunctional attributes of the software. That is, refactoring is intended to improve the code readability and reduce complexity. Such a recommendation may be made to the user to clarify the nonfunctional attributes of these code artifacts so that these two code artifacts clearly indicate that they should not be changed together. In one embodiment, such a recommendation is displayed to the user of computing device 100 on display 115.

In addition to identifying code artifacts which get changed together, computing device 100 also identifies code artifacts which get defected together as discussed below in connection with FIG. 7.

FIG. 7 is a flowchart of a method 700 for identifying code artifacts which get defected together in accordance with an embodiment of the present invention.

Referring to FIG. 7, in conjunction with FIGS. 1 and 4-5, in step 701, a determination is made by computing device 100 as to whether any code artifact defect is detected. As previously discussed, in one embodiment, in an issue tracking system development, bug fixing, defects or refactoring tasks get tracked and assigned. The information is stored in different data fields, such as title, descriptions and comments. Such data fields may contain unrestricted natural language text accompanied with metadata, such as user names or timestamps to complement the natural language data. In one embodiment, the issue tracking system natural language data mixes any kind of information from feature requests or bug reports to rationales, implementation ideas or social interaction.

In one embodiment, computing device 100 identifies code artifact defects from the issue tracking system by utilizing natural language processing algorithms. For example, keywords, such as "defect," may be discovered in the data fields indicating an issue pertaining to a code artifact defect.

If computing device 100 has not detected any code artifact defects, then computing device 100 continues to determine whether any code artifact defect is detected in step 701.

If, however, computing device 100 detected a code artifact defect, then, in step 702, computing device 100 reviews the co-defect association rules to identify any code artifacts that are associated with the detected code artifact that was defected. "Associated," as used herein, refers to a code artifact being associated to the detected code artifact via the co-association rule. For example, if the file "stop.sh" was a code artifact that was defected, then computing device 100 identifies the file "start.ph" as being associated with the file "stop.sh" from the co-defect association rules as shown in table 500 of FIG. 5.

In step 703, a determination is made by computing device 100 as to whether any associated code artifacts were discovered.

If there were no associated code artifacts discovered, then, in step 704, computing device 100 recommends only reviewing the code artifact that was defected. In one embodiment, such a recommendation is displayed to the user of computing device 100 on display 115.

If, however, associated code artifacts were discovered, then, in step 705, a determination is made by computing device 100 as to whether the confidence rating of the associated code artifact also being defected exceeds a threshold value. For instance, referring to the above example pertaining to the files of "stop.sh" and "start.sh," computing device 100 may then compare the confidence rating of 0.923077 (probability of 92.3077%), involving the association rule between "stop.sh" and "start.sh" as shown in table 500 of FIG. 5, to a threshold value, which may be user-selected. In such an example, the association rule indicates that there is a 92.3077% chance that when the file "stop.sh" is defected that the file "start.sh" will be defected.

If the confidence rating exceeds a threshold value, then, in step 706, computing device 100 recommends reviewing the associated code artifact for a potential defect in addition to the code artifact that was defected. For example, referring to the above example, if the confidence rating of 0.923077 (probability of 92.3077%) involving the association rule between "stop.sh" and "start.sh" exceeds a threshold value (e.g., 0.500 or probability of 50%), then computing device 100 recommends to the user of computing device 100 to review the file "start.sh" for a potential defect in addition to reviewing the file "stop.sh" that was defected. In this manner, computing device 100 is informing the user of computing device 100 of an implicit dependency between two code artifacts which get defected together. In one embodiment, such a recommendation is displayed to the user of computing device 100 on display 115.

If, however, the confidence rating does not exceed a threshold value, then computing device 100 recommends only reviewing the code artifact that was defected in step 704. In one embodiment, such a recommendation is displayed to the user of computing device 100 on display 115.

In this manner, the embodiments of the present invention are able to identify implicit dependencies between code artifacts that not only include identifying code artifacts which get changed together but also identifying those code artifacts which get defected together.

Furthermore, the present invention improves the technology or technical field involving software development. As discussed above, software development is the process of conceiving, specifying, designing, programming, documenting, testing, and bug fixing involved in creating and maintaining applications, frameworks, or other software components. Maintaining software can be more and more expensive over time since the quality of the code can decline over time and it becomes more and more challenging to address any defects (e.g., functional errors, compilation errors, missing commands, run time errors, communication problems, logical errors, inappropriate error handling, calculation issues). Such defects may be caused by poorly managed dependencies between source code artifacts (tangible by-products produced during the development of software, such as lines of code, packages, modules, folders, etc.), especially implicit dependencies. As a result, dependencies between source code artifacts (or simply "code artifacts") are important to know throughout the software life. A software artifact is said to be dependent upon another software artifact when the software artifact is reliant upon that other software artifact to function properly. Some dependencies may only exist in the code, such as within a class, as opposed to existing in its public interface. As a result, a user will not be aware of such dependencies (referred to as "implicit dependencies"), such as while instantiating the class. Consequently, implicit dependencies are difficult to identify. Currently, software developers use syntactic analysis in an attempt to identify source code dependencies, such as implicit dependencies. Such analysis may detect code artifacts which change together. However, there is not currently any means for detecting code artifacts which get defected together. For example, if a code artifact is known to be defected (e.g., functional error), other code artifacts could potentially be defected as well. Such information is extremely valuable to the software developer in developing and maintaining software.

The present invention improves such technology by generating co-defect association rules between code artifacts, where such co-defect association rules include a prediction of how likely there will be a defect in a code artifact when there is a defect in an associated code artifact. After detecting a defect in a first code artifact, the co-defect association rules are reviewed to identify any code artifacts associated with the first code artifact. If there is a code artifact associated with the first code artifact, then the probability of the associated code artifact being defected when the first code artifact is defected is obtained from the co-defect association rules. If the probability of the associated code artifact being defected when the first code artifact is defected exceeds a threshold value, then a recommendation is made to the user to review not only the first code artifact that was defected but also its associated code artifact for a potential defect. In this manner, the present invention provides the means for detecting code artifacts which get defected together thereby providing extremely valuable information to the software developer in developing and maintaining the software. In this manner, there is an improvement in the technical field involving software development.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying implicit dependencies between code artifacts, the method comprising:
generating, by a computing device, co-defect association rules between code artifacts using data mining analysis, wherein said co-defect association rules comprise a prediction of how likely there will be a defect in a second code artifact when a first code artifact is defected, wherein said generation of said co-defect association rules between code artifacts comprises:
identifying issue data pertaining to artifact defects from an issue tracking system;
retrieving and storing commit data utilizing natural language processing;
identifying a commit from said stored commit data that is linked to a defect reported in said stored issue data based on a commit log from said commit data;
labeling a code artifact at said identified commit as introducing a defect using natural language processing;
identifying defect labeled code artifacts for each commit;
storing metadata pertaining to said identified defect labeled code artifacts; and
generating said co-defect association rules by performing a data mining analysis on said stored metadata;
detecting, by said computing device, a defect in said first code artifact;
reviewing, by said computing device, said co-defect association rules to identify any code artifacts associated with said first code artifact; and
displaying a recommendation to a user of said computing device, wherein said recommendation recommends reviewing said second code artifact associated with said first code artifact for a potential defect in addition to reviewing said first code artifact in response to identifying said second code artifact being associated with said first code artifact from said co-defect association rules and in response to a probability of said second code artifact being defected when said first code artifact is defected exceeding a first threshold value.

2. The method as recited in claim 1 further comprising:
generating co-change association rules between code artifacts, wherein said co-change association rules comprise a prediction of how likely there will be a change in a fourth artifact when there is a change in a third artifact;
detecting a change in said third code artifact;
reviewing said co-change association rules to identify any code artifacts associated with said third code artifact; and
recommending reviewing a fourth code artifact associated with said third code artifact for a potential change in addition to said third code artifact in response to identifying said fourth code artifact being associated with said third code artifact from said co-change association rules and in response to a probability of said fourth code artifact being changed when said third code artifact is changed exceeding a second threshold value.

3. The method as recited in claim 2 further comprising:
identifying changed code artifacts for each commit;
storing metadata pertaining to said identified changed code artifacts; and
generating said co-change association rules between two code artifacts by performing data mining analysis on said stored metadata, wherein said data mining analysis results in forming association rules revealing underlying correlations between attributes.

4. The method as recited in claim 2 further comprising:
recommending a future refactoring of said fourth code artifact in response to identifying said fourth code artifact being associated with said third code artifact from said co-change association rules and in response to said probability of said fourth code artifact being changed when said third code artifact is changed not exceeding said second threshold value.

5. The method as recited in claim 1, wherein said first and second code artifacts comprise one of the following: a line of code, a routine, a package, a folder, an application and a module.

6. The method as recited in claim 2, wherein said third and fourth code artifacts comprise one of the following: a line of code, a routine, a package, a folder, an application and a module.

7. A computer program product for identifying implicit dependencies between code artifacts, the computer program product comprising a computer readable storage medium having program code embodied therewith, the program code comprising programming instructions for performing the following:
   generating, by a computing device, co-defect association rules between code artifacts using data mining analysis, wherein said co-defect association rules comprise a prediction of how likely there will be a defect in a second code artifact when a first code artifact is defected, wherein said generation of said co-defect association rules between code artifacts comprises:
      identifying issue data pertaining to artifact defects from an issue tracking system;
      retrieving and storing commit data utilizing natural language processing;
      identifying a commit from said stored commit data that is linked to a defect reported in said stored issue data based on a commit log from said commit data;
      labeling a code artifact at said identified commit as introducing a defect using natural language processing;
      identifying defect labeled code artifacts for each commit;
      storing metadata pertaining to said identified defect labeled code artifacts; and
      generating said co-defect association rules by performing a data mining analysis on said stored metadata;
   detecting, by said computing device, a defect in said first code artifact;
   reviewing, by said computing device, said co-defect association rules to identify any code artifacts associated with said first code artifact; and
   displaying a recommendation to a user of said computing device, wherein said recommendation recommends reviewing said second code artifact associated with said first code artifact for a potential defect in addition to reviewing said first code artifact in response to identifying said second code artifact being associated with said first code artifact from said co-defect association rules and in response to a probability of said second code artifact being defected when said first code artifact is defected exceeding a first threshold value.

8. The computer program product as recited in claim 7, wherein the program code further comprises the programming instructions for:
   generating co-change association rules between code artifacts, wherein said co-change association rules comprise a prediction of how likely there will be a change in a fourth artifact when there is a change in a third artifact;
   detecting a change in said third code artifact;
   reviewing said co-change association rules to identify any code artifacts associated with said third code artifact; and
   recommending reviewing a fourth code artifact associated with said third code artifact for a potential change in addition to said third code artifact in response to identifying said fourth code artifact being associated with said third code artifact from said co-change association rules and in response to a probability of said fourth code artifact being changed when said third code artifact is changed exceeding a second threshold value.

9. The computer program product as recited in claim 8, wherein the program code further comprises the programming instructions for:
   identifying changed code artifacts for each commit;
   storing metadata pertaining to said identified changed code artifacts; and
   generating said co-change association rules between two code artifacts by performing data mining analysis on said stored metadata, wherein said data mining analysis results in forming association rules revealing underlying correlations between attributes.

10. The computer program product as recited in claim 8, wherein the program code further comprises the programming instructions for:
    recommending a future refactoring of said fourth code artifact in response to identifying said fourth code artifact being associated with said third code artifact from said co-change association rules and in response to said probability of said fourth code artifact being changed when said third code artifact is changed not exceeding said second threshold value.

11. The computer program product as recited in claim 7, wherein said first and second code artifacts comprise one of the following: a line of code, a routine, a package, a folder, an application and a module.

12. The computer program product as recited in claim 8, wherein said third and fourth code artifacts comprise one of the following: a line of code, a routine, a package, a folder, an application and a module.

13. A computing device, comprising:
    a memory for storing a computer program for identifying implicit dependencies between code artifacts; and
    a processor connected to said memory, wherein said processor is configured to execute the program instructions of the computer program comprising:
       generating co-defect association rules between code artifacts using data mining analysis, wherein said co-defect association rules comprise a prediction of how likely there will be a defect in a second code artifact when a first code artifact is defected, wherein said generation of said co-defect association rules between code artifacts comprises:
          identifying issue data pertaining to artifact defects from an issue tracking system;
          retrieving and storing commit data utilizing natural language processing;
          identifying a commit from said stored commit data that is linked to a defect reported in said stored issue data based on a commit log from said commit data;
          labeling a code artifact at said identified commit as introducing a defect using natural language processing;
          identifying defect labeled code artifacts for each commit;
          storing metadata pertaining to said identified defect labeled code artifacts; and generating said co-defect association rules by performing a data mining analysis on said stored metadata;

detecting a defect in said first code artifact;

reviewing said co-defect association rules to identify any code artifacts associated with said first code artifact; and displaying a recommendation to a user of said computing device, wherein said recommendation recommends reviewing said second code artifact associated with said first code artifact for a potential defect in addition to reviewing said first code artifact in response to identifying said second code artifact being associated with said first code artifact from said co-defect association rules and in response to a probability of said second code artifact being defected when said first code artifact is defected exceeding a first threshold value.

14. The computing device as recited in claim 13, wherein the program instructions of the computer program further comprise:

generating co-change association rules between code artifacts, wherein said co-change association rules comprise a prediction of how likely there will be a change in a fourth artifact when there is a change in a third artifact;

detecting a change in said third code artifact;

reviewing said co-change association rules to identify any code artifacts associated with said third code artifact; and recommending reviewing a fourth code artifact associated with said third code artifact for a potential change in addition to said third code artifact in response to identifying said fourth code artifact being associated with said third code artifact from said co-change association rules and in response to a probability of said fourth code artifact being changed when said third code artifact is changed exceeding a second threshold value.

15. The computing device as recited in claim 14, wherein the program instructions of the computer program further comprise:

identifying changed code artifacts for each commit;

storing metadata pertaining to said identified changed code artifacts; and generating said co-change association rules between two code artifacts by performing data mining analysis on said stored metadata, wherein said data mining analysis results in forming association rules revealing underlying correlations between attributes.

16. The computing device as recited in claim 14, wherein the program instructions of the computer program further comprise:

recommending a future refactoring of said fourth code artifact in response to identifying said fourth code artifact being associated with said third code artifact from said co-change association rules and in response to said probability of said fourth code artifact being changed when said third code artifact is changed not exceeding said second threshold value.

17. The computing device as recited in claim 13, wherein said first and second code artifacts comprise one of the following: a line of code, a routine, a package, a folder, an application and a module.

* * * * *